Patented Dec. 20, 1949

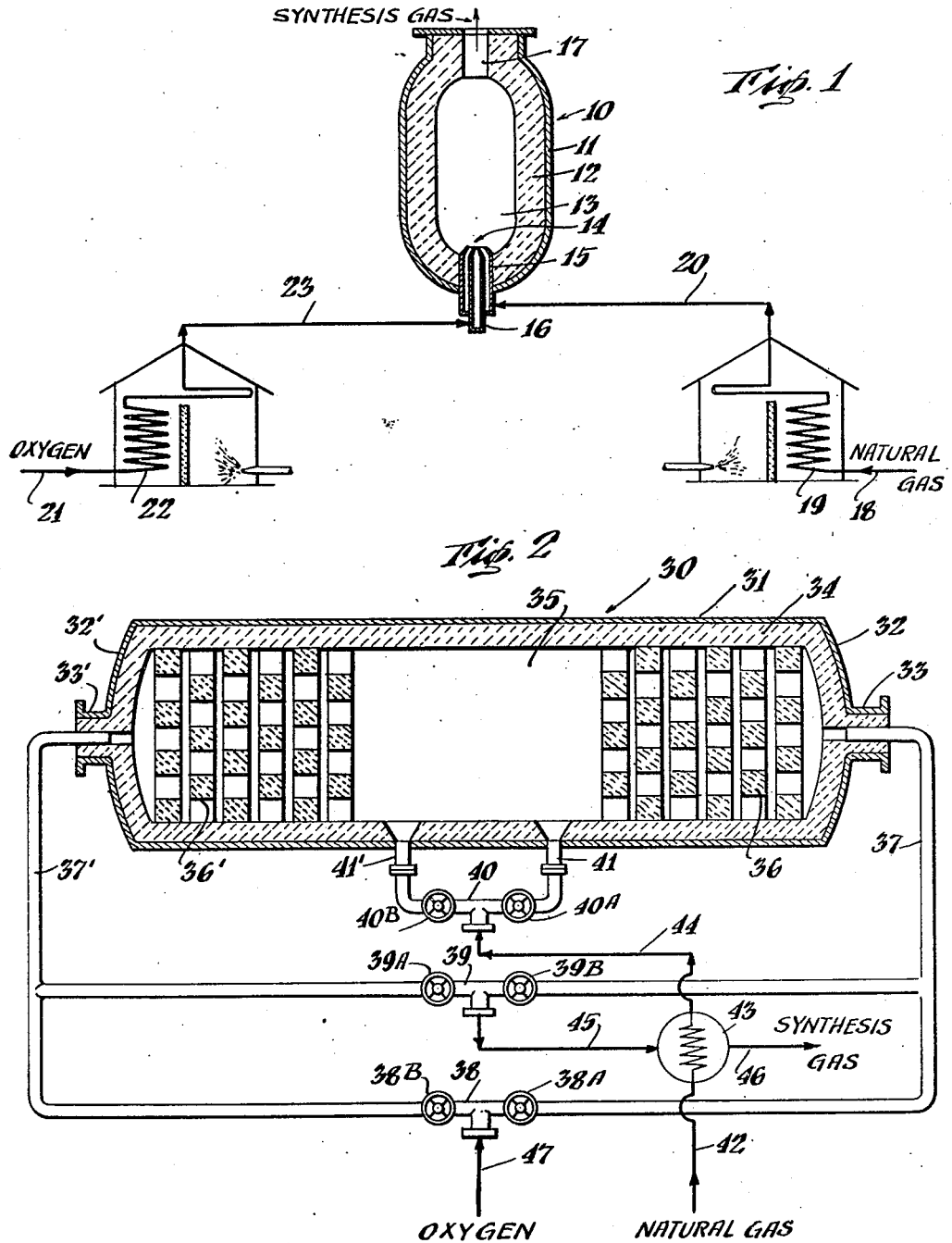

2,491,518

UNITED STATES PATENT OFFICE 2,491,518

GENERATION OF SYNTHESIS GAS

Earl W. Riblett, Tenafly, N. J., assignor to Hydrocarbon Research, Inc., New York, N. Y., a corporation of New Jersey Application April 11, 1947, Serial No. 740,836

5 Claims. (Cl. 252—373)

This invention relates to a process for the production of synthesis gas, i. e., a gas mixture consisting essentially of carbon monoxide and hydrogen, suitable for charging to a synthesis reaction zone for the production of hydrocarbons, oxygenated compounds and the like. More particularly, the invention relates to a process for producing synthesis gas by reacting a hydrocarbon and oxygen of high purity at an elevated pressure.

The catalytic synthesis of hydrocarbons and oxygenated compounds like alcohols and ketones has in the last decade been the subject of extensive research from which noteworthy improvements have stemmed. This research has culminated in the development of a commercial process involving the production of high-quality gasoline hydrocarbons by reacting carbon monoxide and hydrogen at elevated pressure and temperature in the presence of an iron catalyst. It is well to stress that this commercial operation depends on conducting the synthesis reaction at elevated pressure, say 200 to 300 lbs. per sq. in. gauge. While considerable attention has been devoted to the related problem of preparing synthesis gas, the bulk of the art shows that the methods developed or even proposed are based on operation at atmospheric or low pressure. There is no good teaching of a commercially feasible method by which synthesis gas can be generated at elevated pressure without promoting undesirable effects. The undesirable effects of high pressure will be more readily appreciated from a consideration of several reactions which may take place during the generation of synthesis gas and which, using methane for the sake of simplest exemplification, may be expressed by the following equations:

(A) $2CH_4 + O_2 = 2CO + 4H_2$
(B) $CO + 3H_2 = CH_4 + H_2O$
(C) $2CO + 2H_2 = CH_4 + CO_2$
(D) $2CO + O_2 = 2CO_2$
(E) $2CO = CO_2 + C$
(F) $2H_2 + O_2 = 2H_2O$

Equation A covers the desired reaction of methane and oxygen to produce synthesis gas but it is clear from an examination of this equation that high pressure will favor the reverse reaction or, conversely, will suppress the desired reaction. Equations B to F represent five undesired side reactions which are promoted by elevated pressure. Extensive experimentation, with which I am acquainted, corroborated predictions based on such theoretical considerations; carbon formation was particularly serious. Synthesis gas generators filled with refractory and/or catalytic packing material would choke up with deposited carbon within a few hours when operated at high pressure, necessitating a shut-down and cleaning of the generator.

It is an object of this invention to provide a commercially feasible process for the production of synthesis gas by reacting a hydrocarbon and high-purity oxygen at elevated pressure while eliminating or avoiding substantially completely the formation of carbon.

A related object is to produce synthesis gas at high pressure with very efficient utilization of the reactant hydrocarbon and oxygen.

These and other objects of my invention will be apparent in the description which follows.

In accordance with the invention, one or more hydrocarbons, preferably normally gaseous hydrocarbons, are reacted in vapor phase with oxygen of not less than about 95% (by volume) purity, preferably not less than 98% purity, in such proportions that the resulting synthesis gas contains less than about 5.0% by volume of carbon dioxide, preferably less than about 2.0%, and less than about 5.0% by volume of unreacted or residual hydrocarbon, preferably less than about 2.0%. The reaction zone is generally maintained at a temperature above 2000° F., temperatures in the range of 2100° to 2500° F. being particularly advantageous. The reaction is conducted under a pressure of 100 to 500 lbs. per sq. in. gauge, preferably about 200 to 300 lbs. per sq. in. gauge. To effectuate the purposes of the invention, control of the foregoing conditions is coupled with a prolongation or extension of the contact time. The minimum effective contact time is at least about double the contact time required for conducting the same reaction (i. e., same reactants, proportions, temperature, etc.) at atmospheric pressure; at pressures above 200 lbs. per sq. in. gauge, the contact time preferably is made about three to four times that employed at atmospheric pressure. In general, suitable contact times for my process will fall in the range of about 1 to 20 seconds, preferably about 3 to 10 seconds.

Operating in accordance with the foregoing conditions, I have found that the oxygen is substantially completely reacted (the oxygen content of the product synthesis gas is rarely as much as 0.01% by volume), the hydrocarbon is efficiently utilized in forming carbon monoxide and hydrogen, and substantially no free carbon is formed. These results are all the more surprising in the light of the theoretical considerations hereinbefore mentioned. Prolonged contact time and elevated pressure should normally favor poor conversion of hydrocarbon and oxygen to carbon monoxide and hydrogen as indicated by Equations A, B and C and, in turn, unconverted available oxygen under the same conditions should promote the formation of carbon dioxide and water as shown by Equations D and F, respectively, with consequent impairment of the utilization of the reactants in the production of carbon monoxide and hydrogen. These severe reaction conditions should also increase the formation of carbon not only because of the tendency represented by Equation E but also because unreacted available hydrocarbon (per Equation A) and, more particularly, reformed methane (per Equations B and C) are susceptible to degradation to carbon and hydrogen on prolonged exposure to elevated temperatures above 2000° F. That the oxygen used in my process is substantially completely consumed is of prime significance not only in terms of economic utilization of a fairly expensive feed material but also as regards the product synthesis gas which is subsequently passed to a catalytic synthesis zone to form hydrocarbons and/or oxygenated compounds. A synthesis gas having more than a trace of free oxygen is commercially unattractive since the oxygen will oxidize the synthesis catalyst, particularly an iron catalyst, effecting undesired changes in the quality and quantity of the products synthesized and necessitating frequent reduction or regeneration of the synthesis catalyst. Synthesis gas produced by the process of my invention is particularly well suited for direct charging to a catalytic synthesis reactor without intermediate treatment except cooling to a temperature level near that maintained in the synthesis reactor.

As is known, the reaction (Equation A) by which synthesis gas is produced is not strongly exothermic so that to support a reaction temperature above 2000° F. without burning in situ a considerable proportion of the feed hydrocarbon to carbon dioxide, the reactant hydrocarbon and oxygen are preheated to an elevated temperature of at least about 600° F., preferably at least about 1000° F. When preheating to temperatures up to about 700° F., the reactants may be preheated as a mixed stream or as separate streams but when higher preheat temperatures are desired, preheating is advantageously applied to the separate reactant streams. Preheating of the hydrocarbon stream is advisably limited to a temperature level at which no substantial cracking or degradation to free carbon is encountered. With the indicated preheating of the reactants and operating in a reaction system which does not have excessive heat losses, I find it is possible to maintain a reaction temperature above 2000° F. and obtain a synthesis gas containing less than about 5.0% by volume of carbon dioxide and less than about 5.0% by volume of unreacted hydrocarbon. The limited presence of carbon dioxide shows that no substantial proportion of the reactants has been consumed in the formation of this undesired by-product and the limited presence of unreacted hydrocarbon points to a high conversion in spite of the limited amount of heat liberated in situ by the formation of carbon dioxide.

The term, contact time, as used in this specification and the appended claims is intended to mean the time during which the reactant hydrocarbon and oxygen are exposed to the specified reaction conditions and is not bound to any notion of contact with a catalytic or other reactive surface even though, if desired, the reaction may be conducted in a zone filled with catalytic or refractory packing material. From experience, I prefer to use a reactor free of packing material for two reasons. First, packing usually offers some resistance to the flow of the gaseous reactants with the result that some of the reactants diffuse through the refractory lining within the reactor, reacting exothermically between the lining and metal shell and thus creating dangerous hot spots on the walls of the high-pressure reactor. Second, packing, under the conditions followed in my process, appears to magnify any tendency to carbon formation arising from accidental or unavoidable fluctuations in the operation; there is evidence that a little carbon deposited on packing material begets more carbon with cumulative propensity. Accordingly, I strongly favor using an empty or unpacked reactor.

To describe and clarify my invention more fully reference is made to the accompanying drawings of which:

Figure 1 is a schematic representation of a simple form of apparatus suitable for carrying out the process of my invention; and Figure 2 is a schematic representation of another form of apparatus suitable for my purposes and featuring the recovery of heat from the product synthesis gas in preheating the reactants.

Referring to Figure 1, the numeral 10 designates an upright cylindrical generator comprising a metal shell 11 suitable for withstanding elevated pressures and a refractory lining 12 forming an internal reaction zone 13 in which synthesis gas is generated. The reactants are fed into the lower portion of reaction zone 13 through the nozzle 14 which comprises a tube 15 and a concentric, smaller tube 16. One reactant stream is fed through the inner tube 16 while the other reactant is fed through the annular space between the concentric tubes 15 and 16. The reactants are thoroughly mixed on discharging from the open end of the nozzle 14 and immediately proceed to react while flowing upwardly through the reaction zone 13. The product synthesis gas discharges from the generator 10 by way of opening 17 into piping and other equipment (not shown) for the cooling and utilization of the synthesis gas, as desired. The hydrocarbon reactant stream, e. g., natural gas supplied by line 18, flows through a preheater 19 and passes by way of line 20 into the annular space between concentric tubes 15 and 16 of nozzle 14. At the same time the oxygen stream supplied by line 21 flows through preheater 22 and passes by way of line 23 into the inner tube 16 of nozzle 14. The hydrocarbon stream discharging from the annular portion of nozzle 14 and the oxygen stream discharging from the central portion of nozzle 14 become intimately mixed in the lower portion of reaction zone 13 and immediately proceed to react while flowing toward the outlet 17 of generator 10.

Referring to Figure 2, the numeral 30 designates a generator comprising a metal shell 31 with convex ends 32 and 32' provided respectively with outlet openings 33 and 33'. Generator 30 is lined with a refractory material 34 to protect the metal shell 31 against the high temperatures developed within the generator. The interior of generator 30 is divided into a central reaction zone 35 and two adjoining heat-regenerative zones 36 and 36' containing heat-absorptive checker work or similar heat-absorptive bodies. The outlets 33 and 33' are connected respectively to manifolds 37 and 37' which in turn are connected with manifolds 38 and 39. The manifolds 38 and 39 are each provided with a pair of valves 38A and 38B and 39A and 39B, respectively. Another manifold 40 having valves 40A and 40B is connected to inlet openings 41 and 41' which discharge into the reaction zone 35 of generator 30. As shown, natural gas or other desired hydrocarbon feed flows through line 42 into heat exchanger 43 and passes by way of line 44 into manifold 40 while the product synthesis gas discharges from manifold 39 by way of line 45 into heat exchanger 43 and thence passes through line 46 to any desired equipment (not shown) for cooling and utilizing the product gas. At the same time oxygen flowing through line 47 enters the manifold 38. The operation of this regenerative system is readily described in terms of two cycles, which, for convenience, will be referred to as cycle A and cycle B. During cycle A, valves 38A, 39A and 40A are open while valves 38B, 39B and 40B are closed. With this valve setting, oxygen from 47 flows through manifold 38 and valve 38A, manifold 37 and inlet opening 33 into heat-regenerative zone 36. Natural gas preheated by indirect heat exchange with the product synthesis gas in exchanger 43 flows through line 44, manifold 40 and valve 40A and inlet opening 41 into the reaction zone 35. This hydrocarbon stream intermingles with the oxygen stream preheated in heat-regenerative zone 36 and as a reacting mixture flows across the reaction zone 35 entering the heat-regenerative zone 36' when the reaction has been substantially completed. The hot reaction gases, that is, the product synthesis gas, gives up some of its heat to the heat-absorptive packing in heat-regenerative zone 36' and discharges in a partially cooled condition through outlet opening 33', manifold 37', manifold 39 and valve 39A and line 45 into heat exchanger 43 where the synthesis gas gives up additional heat to the incoming hydrocarbon feed stream. From heat exchanger 43 the synthesis gas proceeds to any desired point of utilization. The duration of the operation of cycle A is, of course, dependent upon the heat-absorbing capacity of the regenerative zones 36 and 36'. Thus, when the incoming oxygen stream can no longer be effectively preheated by heat stored within regenerative zone 36 and the hot product gas can no longer be effectively cooled by regenerative zone 36', cycle A is terminated and at the same time cycle B is initiated. During cycle B valves 38B, 39B and 40B are open while valves 38A, 39A and 40A are closed. With this valve setting oxygen flows through manifold 38 and valve 38B, manifold 37' and opening 33' into heat regenerative zone 36'. The oxygen flows through zone 36' and is preheated by the heat stored up in this zone by the hot product gas during the previous cycle A. At the same time the hydrocarbon stream, preheated in exchanger 43, flows through line 44, manifold 40 and valve 40B, and inlet 41' into reaction zone 35 adjacent the region where preheated oxygen discharges from zone 36' into zone 35. The mixed reactants flow across reaction zone 35 and in substantially completely reacted condition enter heat-regenerative zone 36. The reaction gases on flowing through heat-absorptive packing within zone 36 are partially cooled and thence pass through opening 33, manifold 39 and valve 39B and line 45 into heat exchanger 43 where they are further cooled by indirect heat exchange with the incoming hydrocarbon stream. As before, the product gas is withdrawn from heat exchanger 43 by way of line 46 for utilization, as desired. The duration of operation of cycle B is equal to that of cycle A and at the end of cycle B, cycle A is repeated. It is clear that the operation is made substantially continuous by repeating cycles A and B in succession. Ordinarily, regenerative systems are designed for operation in cycles of three to ten minutes, preferably about three to five minutes.

As a specific example of the operation described in connection with the apparatus of Figure 1, the following data are given. The generator 10 has an internal free space or reaction zone 13 of 1000 cubic feet. Natural gas and oxygen are separately preheated to a temperature of 1000° F. by heaters 19 and 22, respectively. The approximate composition of the natural gas is:

| | Per cent by volume |
|---|---|
| $C_1$ hydrocarbon | 84.1 |
| $C_2$ hydrocarbons | 10.3 |
| $C_3$ hydrocarbons | 4.5 |
| $C_4$ hydrocarbons | 0.1 |
| $CO_2$ | 1.0 |

The preheated reactants are charged to the generator at the rates of 836,000 cubic feet of natural gas per hour and 565,000 cubic feet of oxygen per hour, both rates being measured at standard conditions. The reactants under good mixing conditions enter reaction zone 13 maintained at a pressure of 250 lbs. per sq. in. gauge and immediately start to react while flowing to outlet 17. The reaction temperature is about 2500° F. as measured in the gaseous product stream passing through outlet 17. The contact time under these circumstances is calculated to be 6 seconds; this contact time is approximately three times that necessary for generating synthesis gas at atmospheric pressure under otherwise similar conditions. The product gas discharging from outlet 17 is free of carbon particles and has the following composition calculated on the dry basis:

| | Per cent by volume |
|---|---|
| CO | 35.7 |
| $H_2$ | 60.3 |
| $CO_2$ | 1.3 |
| $CH_4$ | 2.7 |

It will be observed that the synthesis gas as produced contains only small volumes of carbon dioxide and methane. The foregoing results indicate that the utilization efficiency of the carbon in the feed is 90% while that of oxygen is 81%.

I may elect to operate the generator at a lower or higher feed rate than that of the foregoing example. At a lower feed rate, the utilization efficiency of both carbon and oxygen is increased at the expense of higher investment costs for the larger equipment required for the lower throughput. Thus, by doubling the contact time and leaving all the other factors in the foregoing example unchanged, a synthesis gas is produced which is still free of carbon particles and which on the dry basis has the following composition:

| | Per cent by volume |
|---|---|
| CO | 35.7 |
| $H_2$ | 61.1 |
| $CO_2$ | 1.2 |
| $CH_4$ | 2.0 |

In this case, the utilization efficiency on the carbon basis is nearly 92% and on the oxygen basis is about 82.5%.

Mention has been made of charging methane or a gas consisting essentially of methane to the generator. It is contemplated, however, that the hydrocarbon charge to the generator may comprise higher molecular weight hydrocarbons either normally gaseous or normally liquid. The hydrocarbon charge may consist essentially of normally liquid hydrocarbons or it may comprise a combination of gaseous and normally liquid hydrocarbons. For the purposes of this invention, liquid hydrocarbons may embrace not only relatively high boiling hydrocarbon mixtures boiling in the range of fuel oil but also asphalt and other solid hydrocarbons which melt and flow when heated.

Higher molecular weight hydrocarbons when charged to the generator undergo some decomposition into lower molecular weight products including methane. Furthermore, the gases in the generator tend to produce some methane in accordance with Equations B and C hereinbefore presented. Therefore, when charging higher hydrocarbon homologs, the regulation of the proportions of oxygen and hydrocarbon in the feed to yield a synthesis gas containing less than about 5% by volume of unreacted or residual hydrocarbon (whether it is the charged hydrocarbon or reformed methane, is immaterial), preferably less than about 2%, is still a valid guide. In all cases, I have found that to decrease the proportion of oxygen fed to the generator to a point such that the product synthesis gas contains more than 5% by volume of hydrocarbon leads to a noticeable formation of free carbon. While I prefer to supply enough oxygen to reduce the hydrocarbon content of the product synthesis gas to less than about 2% by volume, it is not advisable to bring the hydrocarbon content below about 0.5% by volume since the utilization efficiency for oxygen is decreased substantially and very high reaction temperatures exceeding about 3000° F. are developed with adverse effect on the equipment.

Under the conditions specified for my process, it is feasible to attain a utilization efficiency of at least about 75% and frequently over 80% for the oxygen. On the basis of the carbon content, a utilization efficiency of at least about 80% and frequently about 90% or over is realized for the hydrocarbon feed.

Obviously, many modifications and variations of the invention as above set forth may be made without departing from the spirit and scope thereof, and therefore only such limitations should be imposed as are indicated in the appended claims.

What I claim is:

1. The improved process for generating synthesis gas substantially free of carbon, which comprises preheating a hydrocarbon and high-purity oxygen to a temperature of at least about 600° F., charging the preheated reactants into a reaction zone maintained at a temperature above about 2000° F. but not exceeding about 3000° F. and a pressure in the range of about 100 to 500 lbs. per sq. in. gauge, regulating the proportions of the charged reactants and the contact time of said reactants in said reaction zone within the range of about 1 to 20 seconds, so that the product synthesis gas contains not more than about 5% by volume of carbon dioxide and not below about 0.5% but not more than about 5% by volume of hydrocarbon and is substantially free of carbon, said contact time being at least double the contact time required to generate synthesis gas substantially free of carbon when said reaction zone is at atmospheric pressure, and withdrawing the product synthesis gas from said reaction zone.

2. The process of claim 1, wherein the hydrocarbon is predominantly methane.

3. The improved process for generating synthesis gas substantially free of carbon, which comprises preheating a hydrocarbon and high-purity oxygen to a temperature of at least about 600° F., charging the preheated reactants into a reaction zone maintained at a temperature above about 2000° F. but not exceeding about 3000° F. and a pressure in the range of about 200 to 300 lbs. per sq. in. gauge, regulating the proportions of the charged reactants and the contact time of said reactants in said reaction zone within the range of about 3 to 10 seconds so that the product synthesis gas contains not more than about 5% by volume of carbon dioxide and not below about 0.5% but not more than about 2% by volume of hydrocarbon and is substantially free of carbon, said contact time being about three to four times the contact time required to generate synthesis gas substantially free of carbon when said reaction zone is at atmospheric pressure, and withdrawing the product synthesis gas from said reaction zone.

4. The process of claim 3 wherein the hydrocarbon is predominantly methane.

5. The improved process for generating synthesis gas substantially free of carbon, which comprises preheating methane and high-purity oxygen to a temperature of at least about 600° F., charging the preheated reactants into a reaction zone maintained at a temperature above about 2000° F. but not exceeding about 3000° F. and a pressure in the range of about 200 to 500 lbs. per sq. in. gauge, regulating the proportions of the charged reactants and the contact time of said reactants in said reaction zone within the range of 1 to 20 seconds so that the product synthesis gas contains not more than about 2% by volume of carbon dioxide and about 0.5 to 2% by volume of methane and is substantially free of carbon, said contact time being at least double the contact time required to generate synthesis gas substantially free of carbon when said reaction zone is at atmospheric pressure and withdrawing the product synthesis gas from said reaction zone.

EARL W. RIBLETT.

REFERENCES CITED

The following references are of record in the file of this patent:

UNITED STATES PATENTS

| Number | Name | Date |
| --- | --- | --- |
| 1,843,063 | Burke | Jan. 26, 1932 |
| 2,051,363 | Beekley | Aug. 18, 1936 |